United States Patent [19]
Cisar et al.

[11] Patent Number: 5,736,271
[45] Date of Patent: Apr. 7, 1998

[54] BATTERY PACK FOR PORTABLE ELECTRONIC DEVICE

[75] Inventors: James M. Cisar, Wadsworth; Lee E. Leppo, Tallmador, both of Ohio

[73] Assignee: Telxon Corporation, Akron, Ohio

[21] Appl. No.: 672,740

[22] Filed: Jun. 28, 1996

[51] Int. Cl.$^6$ ............................................. H01M 2/10
[52] U.S. Cl. ............................ 429/96; 429/97; 429/99; 361/730
[58] Field of Search ...................... 429/96–100, 123; 361/730, 814; 307/150

[56] References Cited

U.S. PATENT DOCUMENTS

| | | | |
|---|---|---|---|
| 5,183,714 | 2/1993 | Mitsui et al. | 429/123 |
| 5,415,947 | 5/1995 | Mitsui et al. | 429/99 X |
| 5,437,938 | 8/1995 | Mitsui et al. | |
| 5,459,388 | 10/1995 | Illingworth et al. | 429/99 X |
| 5,626,979 | 5/1997 | Mitsui et al. | 429/97 |

*Primary Examiner*—Anthony Skapars
*Attorney, Agent, or Firm*—Watts, Hoffmann, Fischer & Heinke Co., LPA

[57] ABSTRACT

A battery pack adapted to be removably inserted into a battery receiving compartment of a portable electronic device for supplying power to the device is disclosed. The battery pack includes a plurality of cylindrically shaped battery cells and an elongated casing having two spaced apart ends and defining an interior region in which the plurality of battery cells are disposed. Outer cylindrical surfaces of first and second cells and an inner surface of the casing define two elongated open regions extending away from the first end of the casing. The battery pack also includes an integrated circuit board disposed intermediate a first end of the casing and negative and positive connector plates of the cells and includes conductive traces electrically coupled to the connector plates of the first and second cells. The battery pack further includes a pair of open ended elongated sockets adapted to receive respective housing terminal pins when the battery pack is inserted into the housing interior region, the sockets are affixed to the circuit board and extend though the apertures in the board and into the elongated open regions.

21 Claims, 4 Drawing Sheets

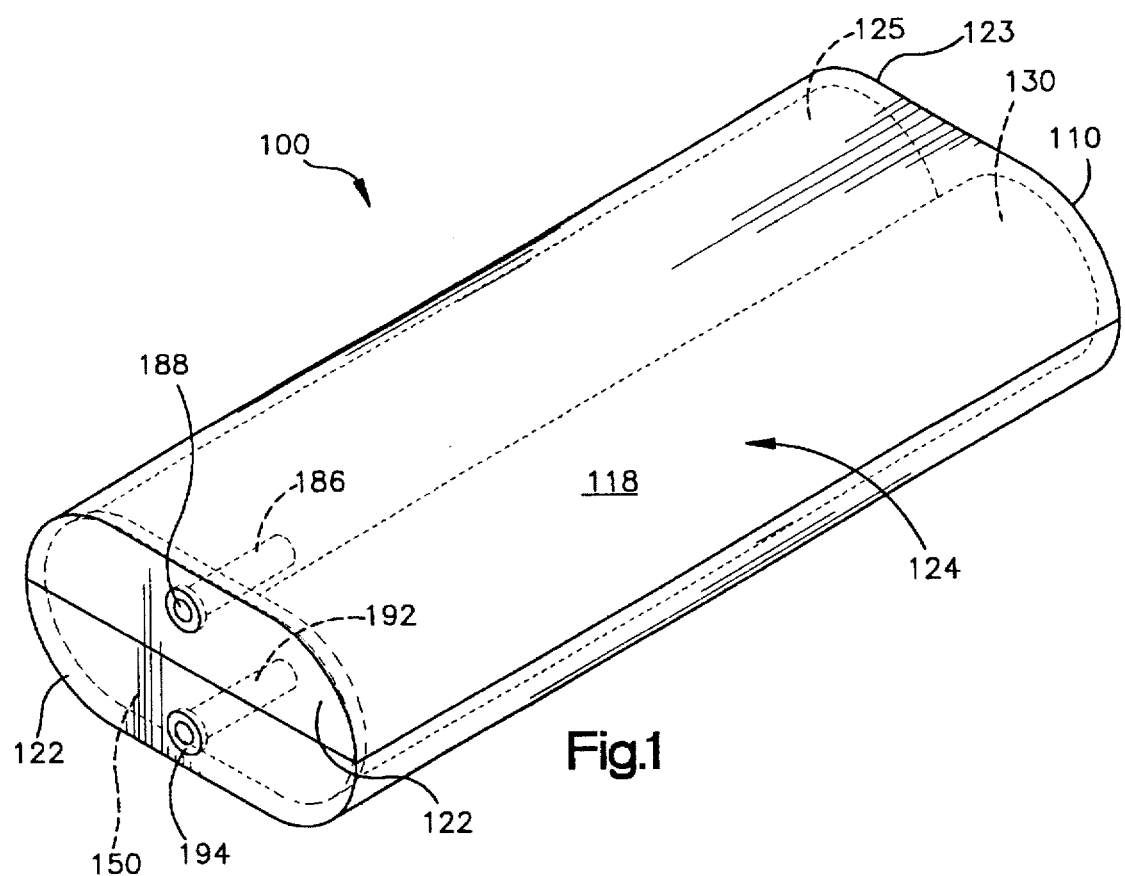
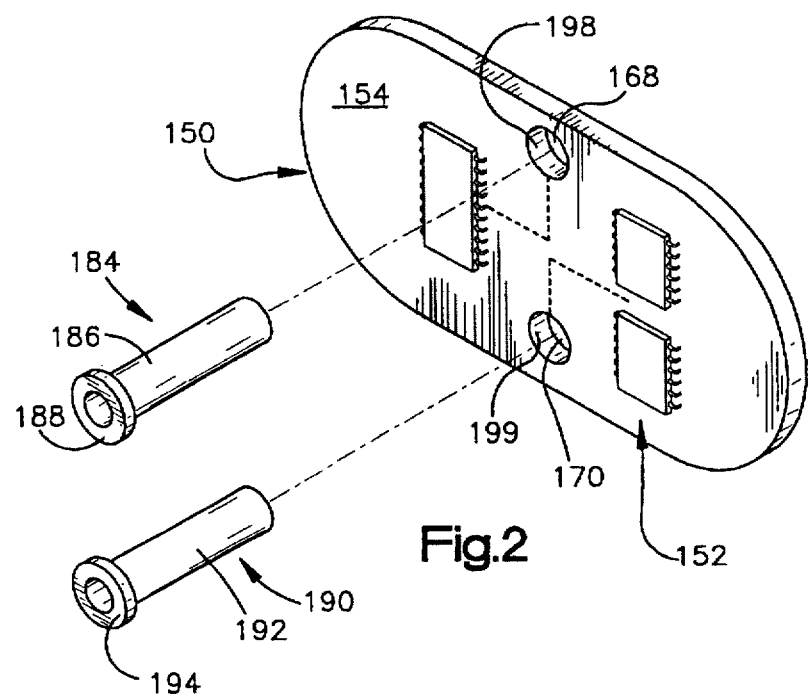

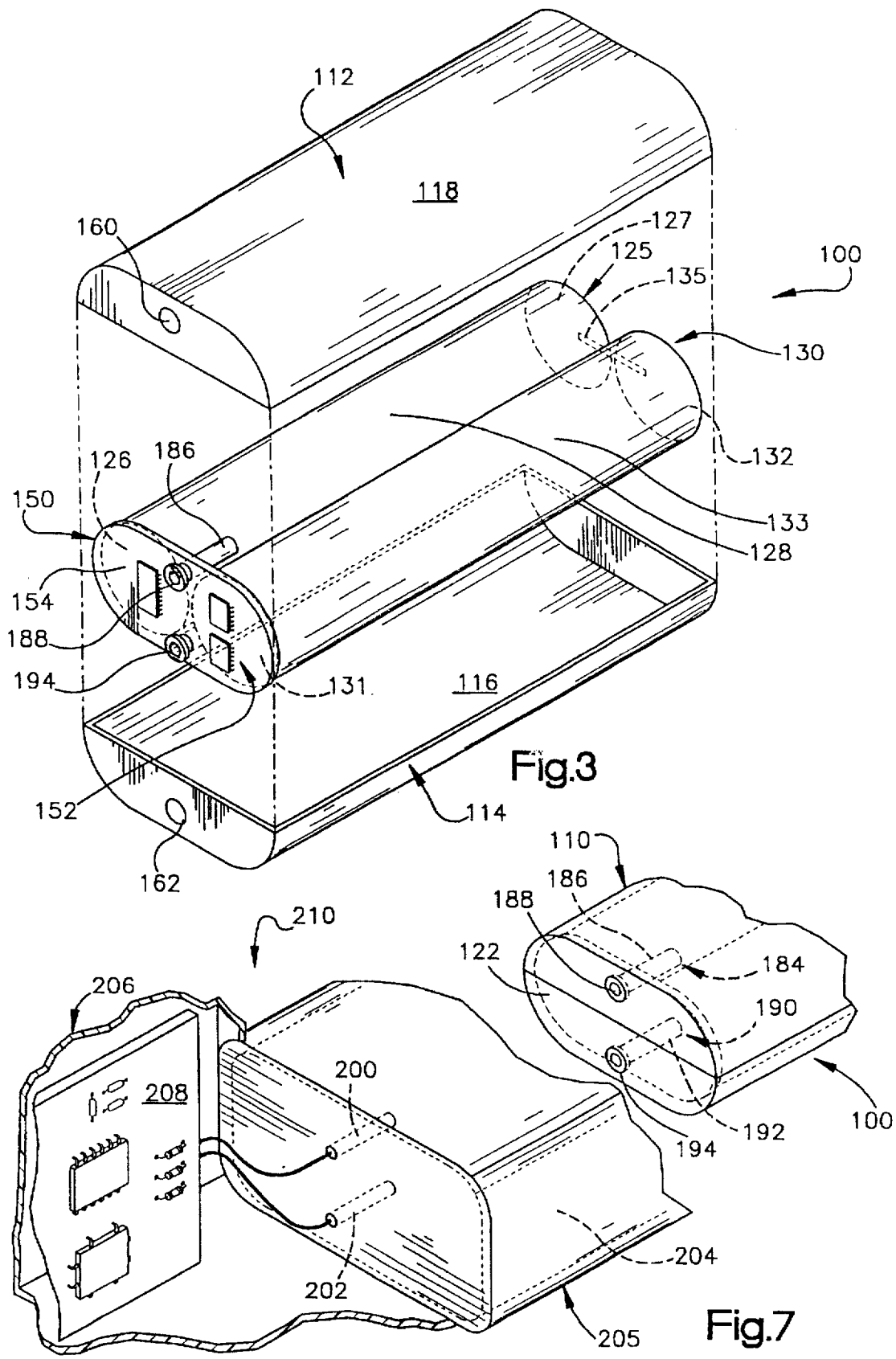

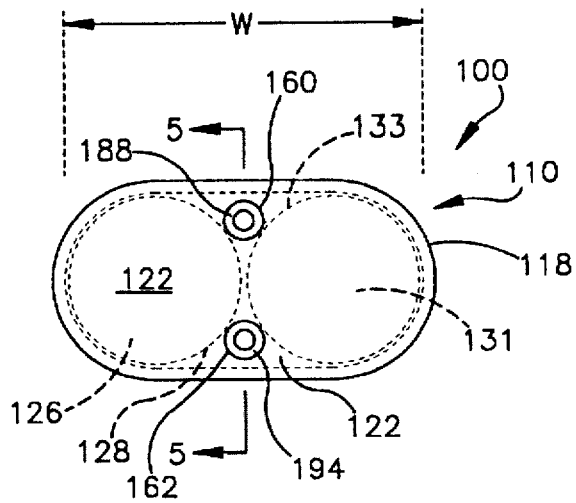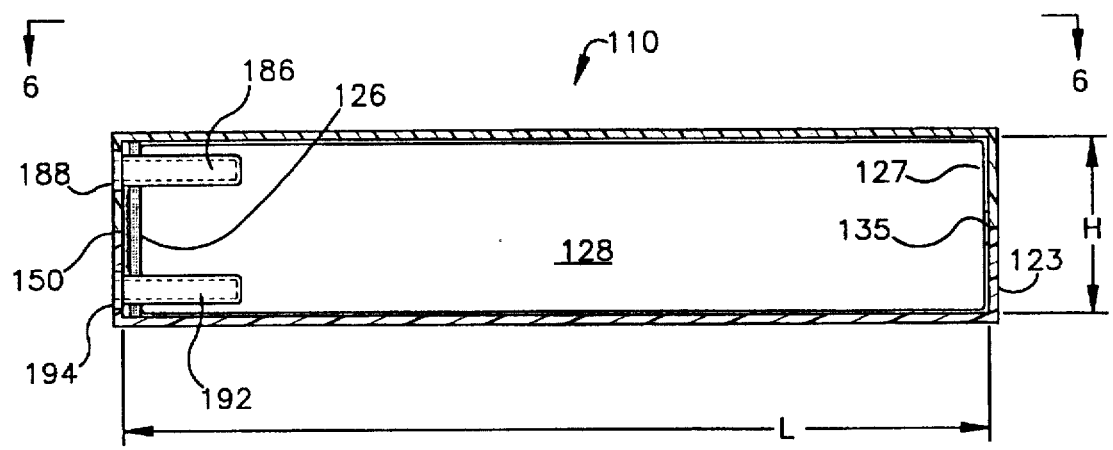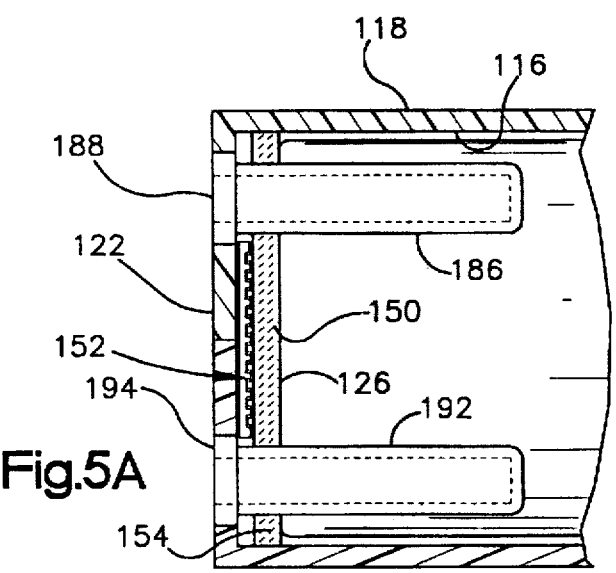

5,736,271

BATTERY PACK FOR PORTABLE ELECTRONIC DEVICE

FIELD OF THE INVENTION

This invention relates to a battery pack for a portable electronic device and, more particularly, to a battery pack for a portable electronic device including a terminal connection assembly and case which minimizes the cross sectional area of the battery pack.

BACKGROUND OF THE INVENTION

Battery packs are widely used in a variety of portable electronic devices such as video recorders, cellular telephones, laptop and workslate computers, hand-held portable data collection devices including bar code dataform readers, portable, hand held power tools, etc. Battery packs are coupled to power supply circuitry of a device to supply power to electronics and/or electro/mechanical assemblies such as a motor which, in turn, drive a mechanical assembly (as in the ease of a portable drill with a rechargeable battery pack). Providing the device with power via a battery pack enables the device to operate independently at remote locations away from sources of AC power from electrical outlets and/or other power sources such as generators.

Current battery packs used in connection with portable electronic device typically are rechargeable. Rechargeable battery packs permit recharging and reuse of the pack thereby saving a purchaser of a device the cost of continuously replacing disposable batteries. A rechargeable battery pack normally comprises a plurality of rechargeable battery cells such as, lithium-ion, nickel-cadmium, and nickel-metal-hydride chemical compositions encased in a cylindrical ease.

Portable devices, such as those described above, typically include a housing defining an opening or compartment to receive the rechargeable battery pack. The compartment to receive the rechargeable batter pack includes positive and negative terminal assemblies for electrically connecting with the battery pack. Prior art battery packs typically included two flat metal surfaces or connectors disposed on an outer shell or casing of the battery pack. In such prior art battery packs, one connector functioned as the anode or positive lead of the battery pack and the other connector functioned as the cathode or negative lead of the battery pack.

When the battery pack is inserted into the battery pack receiving opening, the anode connector contacts the device's positive terminal assembly and the cathode connector contacts the device's negative terminal assembly, completing a circuit and providing power to power supply circuitry of the device. When the battery pack is discharged, the pack is removed from the device and connected to a charger for recharging the pack's battery cells. The charger includes terminal assemblies that contact the anode and cathode connectors respectively of the battery pack for charging the battery cells during a recharging period.

As noted above, the housing of the device supports two terminal assemblies which electrically engage with respective battery pack connectors when the battery pack is inserted in the housing opening, thereby electrically coupling the battery pack to the power supply circuitry of the portable device. Prior art terminal assemblies typically included a pair of spring biased contacts which engaged the flat metal connectors of the battery pack to establish the electrical coupling of the battery cells of the battery pack and the device's power supply circuitry.

The electrical coupling provided by such prior art battery packs and terminal assemblies having spring biased contacts has proven to be unreliable. This is especially true for battery packs placed in portable devices which are carried by employees in the workplace and subjected to bumping, jarring and possibly being dropped to the floor during use. More particularly, under such conditions it has often been found that the spring bias contacts of the device do not provide a positive electrical coupling, that is, the spring bias contacts may intermittently or permanently lose contact with the battery pack connectors for a period of time thereby creating at least a temporary power failure in the device. For certain electronic devices, even a short term power interruption can result in significant operational problems such as loss of data, danger to operator, etc.

In order to maximize the reliability and integrity of contact between the battery pack connectors and the mating terminal assembly terminals, a pin and socket type connection was developed. More specifically, a battery pack including two hollow metal receptacles, or sockets, supported by the casing has been proposed. One socket would be connected to an anode connector of the battery pack and the other socket would be connected to a cathode connector of the pack. In order to provide positive coupling with the respective sockets, the portable device's terminal assemblies would include two terminal pins. When the battery pack was inserted into the housing's compartment for receiving the rechargeable battery pack, the terminal pins would slide into respective sockets of the battery pack thereby providing a reliable electrical connection between the battery pack and the device's power supply circuitry. A battery pack having the pin and socket type connection is described in U.S. Pat. No. 5,437,938, issued Aug. 1, 1995 to Mitsui et al. and assigned to Sony Corporation of Japan. In the '938 patent, a battery pack is disclosed which includes anodic and cathodic tubular terminals disposed in a right upper void and a left upper void of the battery pack casing. The tubular terminals function as connectors into which anode and cathode connecting pins of a mating device slide when the battery pack is inserted into the battery pack receiving opening of the device. Although the '938 patent design provides for reliable electrical contacts, the cross sectional area of the battery pack is increased to accommodate the left upper void and the right upper void regions.

Increasing the cross sectional area of the battery pack is undesirable since the cross sectional area of the device's battery pack opening must correspondingly be increased. The design of the portable device's housing may not accommodate an increased battery pack size given the trend to producing more compact, lighter weight portable devices. Moreover, many electronic devices are designed to have the battery pack inserted in a handle of the device, therefore, ergonomic considerations may prevent the handle portion of the housing from being increased in cross sectional area. Further, even if an electronic device can accommodate an increased battery pack cross sectional area, it is normally desirable to take up as little interior space in the housing as possible with the battery pack so space dedicated to operating assemblies such as electrical circuitry and mechanical assemblies is as great as possible.

Therefore, what is needed is a method and apparatus of providing reliable electrical contacts between a battery pack and terminals assemblies of a mating portable electronic device wherein the cross sectional area of the battery pack is minimized.

SUMMARY OF THE INVENTION

One object of this invention is to provide a rechargeable battery pack adapted to be removably inserted into a battery pack receiving opening of a portable electronic device wherein a cross sectional area of the battery pack is minimized. Another object of this invention is to provide a rechargeable battery pack having a positive electrical coupling between positive and negative terminals of a portable electronic device's terminal assemblies and respective mating connectors of the battery pack. Yet another object of this invention is to provide a rechargeable battery pack having a high impact, durable casing enclosing a plurality of battery cells. Still another object of this invention is to provide a rechargeable battery pack including an integrated circuit (IC) board which supports a pair of spaced apart socket shaped connectors adapted to receive respective terminal pins of a portable electronic device's terminal assemblies and wherein the IC board further includes conductive traces coupling negative and positive connector end plates of the battery pack's battery cells to respective socket connectors.

A rechargeable battery pack is disclosed. The battery pack is adapted to be removably inserted into a battery pack receiving interior region of a portable electronic device housing. The device housing supports two spaced apart terminal assemblies, each assembly including a terminal pin which extends from a wall of the housing into the interior region. The terminal pins are coupled to the device's power supply circuitry to supply power to circuitry of the device.

The battery pack includes an elongated casing defining an interior region which supports a plurality of rechargeable cylindrically shaped battery cells, the casing further includes two spaced apart apertures through one end of the casing adapted to receive the housing terminal pins. The battery cells are connected in series and are disposed in the casing interior region along two substantially parallel longitudinal axis such that a first cell includes a positive connector plate near the one end of the casing and second cell includes a negative connector plate near the one end of the casing. The cells are disposed in the casing such that outer cylindrical surfaces of the first and second cells and the casing define two elongated open regions extending away from the one end of the casing.

The battery pack additionally includes an IC board disposed intermediate the one end of the casing and the negative and positive connector plates and includes conductive traces electrically coupled to respective positive and negative connector plates of the cells. The IC board further includes two spaced apart apertures, which when the battery pack is assembled, are aligned with the casing apertures. The battery pack also includes two hollow open ended elongated conductive sockets adapted to receive respective housing terminal pins when the battery pack is inserted into the housing interior region. The sockets are affixed to the circuit board and extend though the apertures in the board and into the elongated open regions. The sockets extend in a direction substantially parallel to the two cell longitudinal axis. The conductive traces of the IC board electrically couple one socket to the positive connector plate and the other socket to the negative connector plate such that a first housing terminal pin is electrically coupled to the positive connector plate and a second housing terminal pin is electrically coupled to the negative connector plate when the battery pack is inserted into the device's battery pack receiving opening.

The casing comprises upper and lower mating halves fabricated of high impact, highly insulative plastic. The upper and lower casing halves are permanently affixed during assembly by ultrasonically welding or by gluing together with a suitable adhesive. The cells are preferably comprised of a lithium-ion chemical composition. The IC board supports voltage and current limiting integrated circuitry.

By having the sockets extend into the otherwise unused open regions defined by the cell outer cylindrical surfaces and an inner surface of the casing, the overall cross sectional area of the battery pack is minimized. The open regions are substantially triangular shaped when viewed in cross section, with the inner surface of the casing comprising the base of the triangle and outer surfaces of the first and second cells comprising the sides of the cross section triangle. The sides of the cross section triangle are slightly inwardly or concavely bowed because of the cylindrical shape of the outer surface of the first and second cells.

This and other objects, advantages and features of this invention will be become better understood from a detailed description of a preferred embodiment which is described in conjunction with the accompanying drawings.

BRIEF DESCRIPTION OF THE DRAWINGS

FIG. 1 is a perspective view of a rechargeable battery pack of the present invention;

FIG. 2 is an exploded perspective view of an integrated circuit (IC) board and terminal pin receiving socket connectors which extend through spaced apart openings in the IC board and are affixed to the board;

FIG. 3 is an exploded perspective view of the rechargeable battery pack of FIG. 1 with upper and lower halves of the battery casing separated from the battery cells;

FIG. 4 is a front elevation view of the rechargeable battery pack of FIG. 1;

FIG. 5 is a longitudinal cross sectional view of the rechargeable battery pack of FIG. 1 as seen from a plane indicated by the line 5—5 in FIG. 4;

FIG. 5A is an enlarged longitudinal cross sectional view of an end portion of the rechargeable battery pack as seen in FIG. 5 with a pair of battery cells removed;

FIG. 7 is an enlarged perspective view of an end portion of the rechargeable battery pack of FIG. 1 being inserted into an interior battery pack receiving region of a portable device;

Description of the Preferred Embodiment

Figure 6:
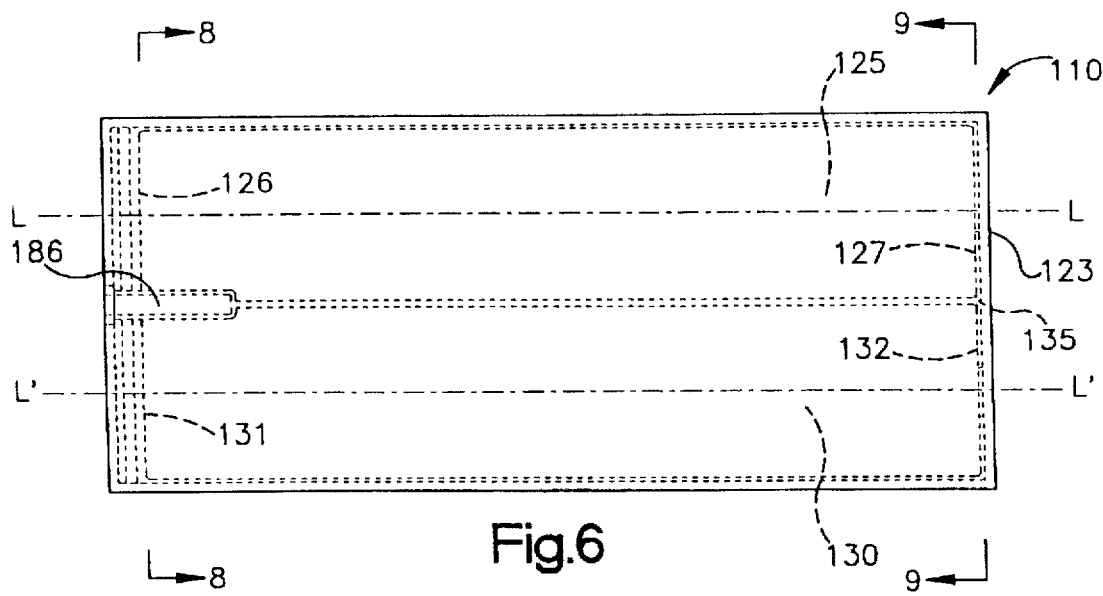
FIG. 6 is a top plan view of the rechargeable battery pack of FIG. 1 as seen from a plane indicated by the line 6—6 in FIG. 5.

A rechargeable battery pack of the present invention is shown generally at 100 in FIG. 1. The battery pack 100 includes an elongated battery casing 110 comprising an upper half 112 and a mating lower half 114 (FIG. 3) fabricated of a high impact, durable plastic with good insulative properties. The upper and lower halves 112, 114 are affixed during assembly of the battery pack 100 preferably by ultrasonic welding the mating edges or by gluing the edges with using a suitable adhesive. The casing 110 includes an inner surface 116 defining an interior region and an outer surface 118. As can be seen in FIG. 1, the casing 110 includes a front face 122 and a back face 123 separated by a middle portion 124 which is substantially oval shaped in cross section.

The interior region of the battery casing 110 houses first and second rechargeable battery cells 125, 130 (FIG. 3). The rechargeable battery cells 125, 130 are preferably lithium-ion (Li-Ion) composition battery cells which are cylindrical in shape. It should be appreciated that the cells 125, 130 may also be comprised of other rechargeable materials such as nickel-cadmium (Ni-Cd), or nickel-metal hydroxide (nickel-metal hydride) (Ni-MH) compositions.

As can best be seen in FIGS. 3 and 5, the battery cell 125 has circular electrical connector end plates 126, 127 separated by a body portion which has a cylindrically shaped outer surface 128. The end plate 126 facing the casing front end 122 comprises the positive terminal of the battery cell 125 while the end plate 127 facing the casing back end comprises the negative terminal of the battery cell.

The battery cell 130 has circular electrical connector end plates 131,132 separated by a body portion which has a cylindrically shaped outer surface 133. The end plate 131 facing the casing front end 122 comprises the negative terminal of the battery cell 130 while the end plate 132 facing the casing back end 123 comprises the positive terminal of the battery cell.

Figure 8:
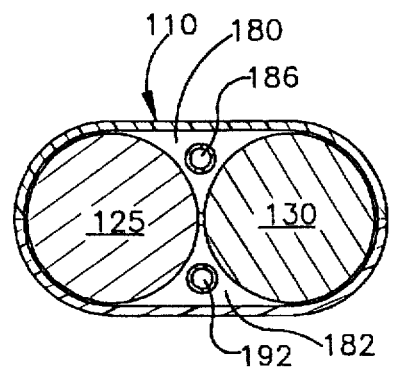
FIG. 8 is a transverse cross sectional view of the rechargeable battery pack of FIG. 1 as seen from a plane indicated by line 8—8 in FIG. 6.
Figure 9:
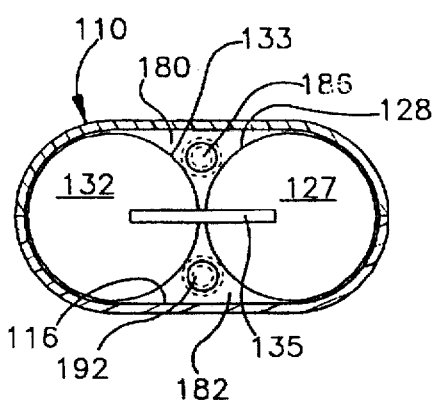
FIG. 9 is a transverse cross sectional view of the rechargeable battery pack of FIG. 1 as seen from a plane indicated by line 9—9 in FIG. 6.

As can be seen in FIGS. 8 and 9, a conductive strip 135 is affixed to the negative end plate 127 of the battery cell 125 and the positive end plate 132 of the battery cell 130 to form an electrical series connection of the cells 125, 130. Further, the end plate 126 is the positive terminal of the series connection of the battery cells 125, 130 and the end plate 131 is the negative terminal of the series connection.

The positive and negative connector plates 126, 131 of the battery cell 125, 130 are soldered to a rear surface of an integrated circuit (IC) board 150. Mounted on a front surface 154 of the IC board 150 is voltage and current regulating circuitry, shown generally as IC circuitry 152 (FIG. 3). The casing 110 is sized to snugly receive the components disposed in the casing. That is, a width W (FIG. 4) of the casing interior region is substantially equal to a sum of a diameter of cell 125 plus a diameter of cell 130 or, since the diameters and lengths of the cells 125, 130 are substantially equal, the width W is equal to two times the diameter of either cell 125, 130.

A height H (FIG. 5) of the casing interior region is substantially equal to the diameter of either cell 125, 130. A length L (FIG. 5) of the casing interior region is substantially equal to a length of either battery 125, 130 plus a thickness of the IC board 150 plus a thickness of the thickest of the IC components 152a mounted on the IC board front surface 154 plus a thickness of the conductive strip 135. Thus, the components in the casing 110 are constrained from movement within the casing interior region.

The front end 122 of the battery casing 110 further contains spaced apart circular apertures 160, 162 (FIG. 3) which provide openings into which enlarged end portions 188, 194 of socket shaped connectors 184, 190 of a pin and socket electrical coupling assembly fit (best seen in FIG. 1). Aligned with the apertures 160, 162 are corresponding circular apertures 168, 170 in the IC board 150 (best seen in FIG. 2). The peripheral regions of the IC board defining the circular apertures 168, 170 are coated with a conductive material 198, 199. The conductive coatings 198, 199 provide for a positive electrical coupling of conductive traces (not shown) on the IC board to respective socket connectors 184, 190 (to be discussed below) of a terminal pin and socket assembly which are inserted in the apertures 168, 170.

The precise placement of the apertures 160, 162, 168, 170 and the sockets 184, 190 with respect to the front face 122 of the casing is significant for minimizing a cross sectional area of the battery pack 100. As shown in FIG. 9, the casing and IC board apertures 160, 168 are substantially centered with respect to a triangular shaped open region 180 formed by the battery cells body portion outer surfaces 128, 133 and the inner surface 116 of the casing 110. Similarly, the apertures 162, 170 are substantially centered in a triangular shaped open region 182 formed by the cylindrical outer surface of the battery cell body portion outer surfaces 128, 133 and the inner surface 116 of the casing lower half 114. The open regions 180, 182 are substantially triangular in cross section (as best seen in FIGS. 8 and 9) and extend from the casing inner surface front end 122 to the casing inner surface back end 123. The open regions 180, 182 are generally shaped like isosceles triangles when viewed in cross section, with the casing inner surface 116 serving as a base of the respective triangles and the battery cell body portion outer surfaces serving as the sides of the triangles. It should be noted that since the battery cell body portion outer surfaces are cylindrical, the sides of the triangles are inwardly bowed or concave so the triangles are not perfect geometric isosceles triangles but rather triangles with slightly inwardly bowed sides.

Referring now to FIG. 7, the pin and socket assembly which provides electrical coupling between the battery pack 100 and a circuitry mounted on a printed circuit board 208 in a portable electronic device the battery pack is inserted into comprises the pair of hollow socket shaped connectors 184, 190. The sockets 184, 190 are hollow and include respective elongated body portions 186, 192 and enlarged end portions 188, 194. The hollow interior regions of the sockets 184, 190 receive a spaced apart pair of electrical terminal pins 200, 202 of the portable electronic device 210 the battery pack 100 will be inserted in. A length of the socket body portion 186 is situated in the IC board aperture 168 (FIG. 2) such that there is a gap between the enlarged end portion 188 and the board front surface 154 corresponding to the a thickness of a thickest IC chip of the IC circuitry 152 mounted on the front surface. The socket body portion 186 is soldered to the board 150 and makes positive electrical contact with the conductive material 198, the conductive traces (shown in dashed line to FIG. 2) on the IC board connected to the conductive material 198 and the battery cell end plate 126 connected to the conductive traces. Similarly, a length of the socket body portion 192 is situated in the IC board aperture 170 such that there is a gap between the enlarged end portion 194 and the board front surface 154 corresponding to the thickness of the thickest IC chip of the IC circuitry 152 mounted on the front surface. The socket body portion 192 is soldered to the board 150 and makes positive electrical contact with the conductive material 199, the conductive traces (shown in dashed line in FIG. 2) on the IC board connected to the conductive material 199 and the battery cell end plate 132 connected to the conductive traces.

As can best be seen in FIG. 5A, most of the length of the socket body portions 186, 192 extend beyond a back surface of the IC board 150 and into the open regions 180, 182 (FIGS. 8 and 9) in a direction substantially orthogonal to the casing front end 122 and substantially parallel to a longitudinal axis of cells 125, 130 (labeled L—L and L'—L' FIG. 6). When the battery pack 100 is assembled, the socket enlarge ends 188, 184 extend into the casing apertures 160, 162 such that outer surfaces of the ends 188, 194 are substantially flush with the outer surface 118 of the front end 122 of the casing 110.

By positioning the sockets 184, 190 such that they are aligned with and extend into the open regions 180, 182, a reliable pin and socket electrical connection is provided between the battery pack 100 and device power supply circuitry without adding to the overall cross sectional area of the battery pack 100. The hollow interior regions of the sockets 184, 190 are sized to snugly receive the electrical terminal pins 200, 202, the pins and sockets having a slight interference fit. As can best be seen in FIG. 7, the terminal pins 200, 202 extend into a battery receiving opening 204 in a handle portion 205 of a housing 206 of the electronic device 210.

The handle portion 205 of the housing 206 includes a battery pack receiving opening compartment which is sized to receive the battery pack 100. As shown, the two terminal pins 200, 202 extend into the opening 204 and are positioned such that pins 200, 202 are inserted into the hollow interior regions of the sockets 184, 190 when the battery pack 100 is inserted into the opening. The terminal pins 200, 202 are electrically coupled to power supply circuitry mounted on the printed circuit board 208 supported in the housing 206. The engagement of the terminal pins 200, 202 and respective sockets 184, 190 forms a pin and socket assembly connection that electrically couple the battery cells 125, 130 to the device's power supply circuitry. The power supply circuitry, in turn, provides appropriate power to electrical circuitry and electronics of the device. The pin and socket assembly connection formed by the terminal pins 200, 202 and respective sockets 184, 190 form a reliably electrical coupling which can withstand accidental bumping or jarring of the electronic device housing 206.

While this invention has been shown and described with reference to one preferred embodiment, it is obvious that equivalents and modifications will occur to others skilled in the art upon the reading and understanding of the foregoing description. For example, a longitudinal portion of the casing middle portion 124 overlying the open regions 180, 182 could be curved slightly inwardly or outwardly instead of being substantially flat thus changing the shape of the open regions. Such curved surfaces may, for instance, be used to serve as guides to guide a battery pack into, or out of, a battery receiving compartment of a portable electronic device.

Further, the preferred embodiment is described above with reference to only two cells 125, 130 which are aligned in parallel. However, it should be appreciated that three or more battery cells aligned in parallel could be disposed in a casing thereby forming three or more open regions extending from an inner surface of a front end of the casing. Each of the open regions could receive a portion of a socket body portions extending rearwardly of the IC board 15. Further, while each socket 184, 190 is shown to be situated in different respective open regions 180, 182, it should be appreciated that both sockets 184, 190 could be situated adjacent one another in the same open region.

Thus, the present invention includes all such equivalents and modifications, and is limited only by the scope of the following claims.

We claim:

1. A battery pack adapted to be removably inserted into a battery receiving compartment of a portable electronic device for supplying power to the device, the device housing including two substantially parallel electrical terminal pins extending into the battery receiving compartment from a portion of a wall defining the compartment, the terminal pins electrically connected to power supply circuitry of the device, the battery pack comprising:
   a) a plurality of cylindrically shaped battery cells for providing power to the device;
   b) an elongated casing having two spaced apart ends and defining an interior region in which the plurality of battery cells are disposed along two substantially parallel longitudinal axis such that a first cell includes a positive connector plate near a first end of the casing and second cell includes a negative connector plate near the first end of the casing, outer cylindrical surfaces of the first and second cells and an inner surface of the casing defining two elongated open regions extending away from the first end of the casing, the casing further including two spaced apart apertures through the first end of the casing sized to accepting the housing terminal pins;
   c) an integrated circuit board disposed intermediate the first end of the casing and the negative and positive connector plates and including conductive traces electrically coupled to the connector plates of the first and second cells;
   d) a pair of open ended elongated sockets adapted to receive respective housing terminal pins when the battery pack is inserted into the housing battery receiving compartment, the sockets being affixed to the circuit board and extending though the apertures in the board and into the elongated open regions in a direction substantially parallel to the two longitudinal axis of the cells; and
   e) the conductive traces of the board electrically coupling one socket to the positive connector plate and electrically coupling the other socket to the negative connector plate such that a first housing terminal pin is electrically coupled to the positive connector plate and a second housing terminal pin is electrically coupled to the negative connector plate when the battery pack is inserted into the housing battery receiving compartment.

2. The battery pack of claim 1 wherein the casing is comprised of plastic.

3. The battery pack of claim 1 wherein the sockets are affixed to the integrated circuit board by soldering.

4. The battery pack of claim 1 wherein the integrated circuit board includes voltage and current regulating circuitry coupled to the conduction traces.

5. The battery pack of claim 1 wherein each of the sockets includes an enlarged end portion which fits into respective different ones of the two spaced apart apertures.

6. The battery pack of claim 1 wherein the first and second battery cells are comprised of a rechargeable lithium ion composition.

7. The battery pack of claim 1 wherein each of the two elongated open regions is substantially triangular in shape when viewed in section perpendicular to a longitudinal axis of the casing.

8. A battery pack adapted to be removably inserted into a battery receiving compartment of a portable electronic device, the battery pack comprising:
   a) a plurality of cylindrically shaped battery cells, wherein the plurality of battery cells includes a first battery cell having a first outer cylindrical surface and a second battery cell having a second outer cylindrical surface;
   b) a battery pack casing having a front face and an interior region, the front face having a first aperture and a second aperture, and the interior region housing the plurality of battery cells, the first battery cell and the second battery cell being situated such that a plane defined by the outer surface of the first battery cell is substantially parallel to a plane defined by the outer surface of the second battery cell and each of the first and second outer surfaces are substantially tangential to the front surface of the battery pack casing, whereby a pair of triangular shaped open regions are formed by the outer surface of the first battery cell, the outer surface of the second battery cell and the interior region of the battery pack casing;

c) a first socket for receiving a first terminal housing pin through the first aperture in the front facing of the battery casing when the battery pack is inserted into the receiving compartment, the first socket providing an anode connection receptacle between the portable electronic device and the battery pack and the first socket substantially located within one of the pair of triangular shaped open regions; and d) a second socket for receiving a second terminal housing pin through the second aperture in the front face of the battery casing when the battery pack is inserted into the receiving compartment, the second socket providing a cathode connection receptacle between the portable electronic device and the battery pack and the second socket substantially located within one of the pair of triangular shaped open regions.

9. The battery pack of claim 8 wherein said first battery cell has a positive connector plate near said front face of said battery casing and said second battery cell has a negative connector plate near said front face of said battery casing, said battery pack further comprising:

a) a circuit board disposed within said battery pack casing and positioned intermediate said front face and said positive and negative connector plates, said circuit board having an anode aperture and a cathode aperture, said anode aperture electrically coupled to said positive connector plates via a first conductive trace and said cathode aperture electrically coupled to said negative connector plate via a second conductive trace; and b) wherein said first socket is electrically coupled to the circuit board at the anode aperture and said second socket is electrically coupled to the circuit board at the cathode aperture.

10. The battery pack of claim 8 wherein said first socket is located in a first one of the pair of said triangular shaped open regions and said second socket is located in a second one of the pair of triangular shaped open regions.

11. The battery pack of claim 8 wherein said first battery cell and said second battery cell are connected in series.

12. The battery pack of claim 8 wherein said plurality of battery cells are rechargeable.

13. A portable electronic device comprising:

a) a housing defining a battery pack receiving compartment;

b) a pair of spaced apart terminal pins extending into the battery pack receiving compartment, the pair of pins being electrically coupled to power supply circuitry of the device;

c) a rechargeable battery pack adapted to slidingly interfit into the battery pack receiving compartment, the rechargeable battery pack including:

i) an elongated casing having a first end and a second end spaced apart by a body portion, the casing defining an interior region and including a spaced apart pair of apertures in the first end sized to accept the pair of spaced apart terminal pins;

ii) two elongated, rechargeable battery cells disposed in the casing interior region, a longitudinal axis of each cell being substantially parallel and substantially orthogonal to a first end of the casing, the cells being electrically coupled; and iii) a pair of elongated, spaced apart terminal pins receiving sockets, coupled to a charge conducting ends of the cells disposed adjacent the first end of the casing, one of the ends being positively charged and the other end being negatively charged, at least one socket positioned to extend from one of the pair of apertures of the casing into a first open region in the casing interior region substantially bounded by a portion of an outer surface of each cell and a portion of an inner surface of the casing body portion adjacent the casing first end, a longitudinal axis of the at least one socket being substantially orthogonal to the first end of the casing the sockets receiving a respective one of the pair of terminal pins to electrically couple the battery cells to the power supply circuitry.

14. The portable electronic device of claim 13 wherein the other socket of the pair of sockets is positioned to extend from the other of the pair of apertures of the casing into a second open region in the casing interior region substantially bounded by a portion of an outer surface of each cell and a portion of an inner surface of the casing body portion adjacent the casing first end, a longitudinal axis of the other socket of the pair of sockets being substantially orthogonal to the first end of the casing.

15. The portable electronic device of claim 13 wherein the casing is comprised of plastic.

16. The portable electronic device of claim 13 wherein an integrated circuit board is disposed intermediate the first end of the casing and the battery cells and includes conductive traces electrically coupled to the cells.

17. The portable electronic device of claim 16 wherein the sockets are affixed to the integrated circuit board by soldering.

18. The portable electronic device of claim 16 wherein the integrated circuit board includes voltage and current regulating circuitry coupled to the conductive traces.

19. The portable electronic device of claim 13 wherein each of the sockets includes an enlarged end portion which fits into respective different ones of the two spaced apart pair of apertures.

20. The portable electronic device of claim 13 wherein the battery cells are comprised of a rechargeable lithium ion composition.

21. The portable electronic device of claim 14 wherein each of the two elongated open regions is substantially triangular in shape when viewed from a plane perpendicular to a longitudinal axis of the casing.

* * * * *